(12) United States Patent
Curi

(10) Patent No.: US 7,635,307 B2
(45) Date of Patent: Dec. 22, 2009

(54) PROPELLER SHAFT

(75) Inventor: Jason T. Curi, Auburn Hills, MI (US)

(73) Assignee: GKN Driveline North America, Inc., Auburn Hills, MI (US)

(*) Notice: Subject to any disclaimer, the term of this patent is extended or adjusted under 35 U.S.C. 154(b) by 583 days.

(21) Appl. No.: 11/452,150

(22) Filed: Jun. 13, 2006

(65) Prior Publication Data
US 2006/0258466 A1 Nov. 16, 2006

Related U.S. Application Data

(63) Continuation-in-part of application No. 10/841,089, filed on May 6, 2004, now abandoned.

(51) Int. Cl.
*F16D 3/00* (2006.01)
(52) U.S. Cl. .................. 464/140; 464/906; 464/182
(58) Field of Classification Search ............ 180/905, 180/906, 379; 464/23, 182, 906, 140
See application file for complete search history.

(56) References Cited

U.S. PATENT DOCUMENTS

| | | | | |
|---|---|---|---|---|
| 3,204,429 | A | * | 9/1965 | Kayser .................. 464/141 |
| 4,000,629 | A | * | 1/1977 | Bellomo ................ 464/144 |
| 4,202,184 | A | * | 5/1980 | Krude et al. ........... 464/146 |
| 4,573,947 | A | * | 3/1986 | Hazebrook et al. ...... 464/146 |
| 4,892,433 | A | * | 1/1990 | Schreiber ............ 403/359.1 |
| 5,334,096 | A | * | 8/1994 | Iwao ..................... 464/146 |
| 6,530,843 | B2 | * | 3/2003 | Miller et al. ........... 464/145 |
| 6,793,581 | B2 | * | 9/2004 | Meyer et al. ............. 464/15 |
| 6,928,712 | B2 | * | 8/2005 | Cermak .................. 29/428 |
| 6,971,958 | B2 | * | 12/2005 | Uchman et al. ......... 464/145 |
| 2002/0077185 | A1 | * | 6/2002 | Meyer et al. ........... 464/145 |

* cited by examiner

*Primary Examiner*—Aaron M Dunwoody
(74) *Attorney, Agent, or Firm*—Jennifer M. Brumbaugh; Mick A. Nylander

(57) ABSTRACT

An illustrative embodiment includes a propshaft system including a first constant velocity joint generally defining a first axis and having an inner first race, an outer first race, and a first grease cover mated to the outer first race. The propshaft system also includes a first flange having a first flange mating surface and a first flange contour surface. The propshaft system also includes a second constant velocity joint generally defining a second axis and having an inner second race, an outer second race, and a second grease cover mated to the outer second race. The second grease cover is defined, at least in part, by a second grease cover flange surface and a second grease cover contour surface. The propshaft system additionally includes a propshaft portion extending at least partially between the first connection apparatus and the second connection apparatus. The second grease cover contour surface will interfere with the first flange contour surface to provide a visual notification of incorrect orientation of the propshaft portion within the propshaft system.

16 Claims, 9 Drawing Sheets

PROPELLER SHAFT

RELATED APPLICATIONS

This application is a continuation-in-part of U.S. patent application Ser. No. 10/841,089, filed May 6, 2004, which is incorporated by reference in its entirety.

TECHNICAL FIELD

The present invention generally relates to a power transfer system for a motor vehicle, and more particularly, relates to an improved propeller shaft having an in-vehicle installation error proofing apparatus and method to encourage proper installation of the propeller shaft in the vehicle drive line.

BACKGROUND

There are generally four main types of automotive drive line systems. More specifically, there exists a full time front wheel drive system, a full time rear wheel drive system, a part time four wheel drive system, and an all wheel drive system. Most commonly, the systems are distinguished by the delivery of power to different combinations of drive wheels, i.e., front drive wheels, rear drive wheels, or some combination thereof. In addition to delivering power to a particular combination of drive wheels, most drive systems permit the respectively driven wheels to rotate at different speeds. For example, the outside wheels must rotate faster than the inside drive wheels, and the front drive wheels must normally rotate faster than the rear wheels.

Drive line systems also include one or more Cardan (universal) and constant velocity joints (CVJ). Cardan joints are the most basic and common type joint used for example, in prop shafts. Although highly durable, Cardan joints are typically not suited for applications with high angles (e.g., greater than 2 degrees) because of their inability to accommodate constant velocity rotary motion. Constant velocity joints, in contrast, are well known in the art and are employed where transmission of a constant velocity rotary motion is desired or required. For example, a tripod joint is characterized by a bell shaped outer race (housing) disposed around an inner spider joint which travels in channels formed in the outer race. This spider shape cross section of the inner joint is descriptive of the three equal spaced arms extending therefrom which travel on the tracks of the outer joint. Part spherical rollers are featured on each arm.

One type of constant velocity universal joint is a plunging tripod type, characterized by the performance of end motion in the joint. Plunging tripod joints are currently the most widely used in-board (transmission side) joint in front wheel drive wheels, and particularly in the prop shafts found in rear wheel drive, all wheel drive and four wheel drive vehicles. A common feature of tripod universal joints is their plunging or end motion character. Plunging tripod universal joints allow the interconnection shafts to change length during operation without the use of splines which provoke significant reaction forces thereby resulting in a source of vibration and noise. Other common types of constant velocity joints are the plunging VL or cross groove type joint which consists of an outer race and inner race drivably connected through balls located in circumferentially spaced straight or helical grooves alternately inclined relative to a rotational axis. A high speed fixed joint is another type of constant velocity well known in the art and used where transmission of high speed is required. The disc style constant velocity fixed joint is another type of joint known in the prior art. This joint has an outer joint member open on both ends and a cage is assembled from the end opposite the end towards which the cage is urged by the ball expulsion forces under articulated load conditions. The prior art also includes a mono block constant velocity fixed joint also known as a mono block high speed fixed joint. The outer joint part is a bell shaped member having a closed end.

Drive line systems also include one or more ball spline joints which include a plurality of balls enclosed within a cage to permit rotation around inner and outer respective races. Like constant velocity joints, ball spline joints are adapted to accommodate plunge in the axial direction, i.e., end wise movement. However, unlike constant velocity joints, ball spline joints do not permit articulation at angle.

A typical drive line system incorporates one or more of the above joints in an all wheel drive or traditional four wheel drive system. In an all wheel drive systems, such joints are used to connect a pair of propeller shafts to a power take off unit and a rear driveline module, respectively. These propeller shafts function to transfer torque to the rear axle in rear wheel and all wheel drive vehicles. Similarly, in a traditional four wheel drive system, such joints are used to connect a propeller shaft between a transfer case and a front axle.

In the prior art there have been problems with the insertion and installation of a propeller shaft having a high speed fixed joint on one end and a VL plunging joint on the opposite end. The problem occurs when the shaft is installed into the vehicle backwards because both the high speed fixed joint and the VL plunging joint have the same outer diameter and bolt pattern (PCD). If the shaft is installed in the vehicle backwards, it may lead to damage of the VL plunging joint or the high speed fixed joint. Furthermore, the driveline system will not operate as designed if the prop shaft is installed backwards (incorrectly orientated).

Therefore, there is a need in the art to provide a propeller shaft having an in vehicle installation error proofing method to insure that the prop shafts are installed in the correctly aligned position within the driveline of the automotive vehicle. There also is a need in the art for an improved cover, including a mechanical stop to ensure proper installation of the prop shaft within the driveline of the automotive vehicle

SUMMARY

An illustrative embodiment includes a propshaft system including a first constant velocity joint generally defining a first axis and having an inner first race, an outer first race, and a first grease cover mated to the outer first race. The first grease cover is defined, at least in part, by a first grease cover flange surface and a first grease cover contour surface. The propshaft system also includes a first flange having a first flange mating surface and a first flange contour surface. The first flange is selectively coupled to the first constant velocity joint such that the first flange mating surface is in contact with the first grease cover flange surface, and the first flange contour surface is directly adjacent the first grease cover contour surface. The first constant velocity joint and the first flange at least partially define a first connection apparatus. The propshaft system also includes a second constant velocity joint generally defining a second axis and having an inner second race, an outer second race, and a second grease cover mated to the outer second race. The second grease cover is defined, at least in part, by a second grease cover flange surface and a second grease cover contour surface. The propshaft system further includes a second flange having a second flange mating surface and a second cover contour surface. The second flange is selectively coupled to the second constant velocity joint such that the second flange mating surface is in contact with the second grease cover flange surface, and the second cover contour surface is directly adjacent the second grease cover contour surface. The second constant velocity joint and the second flange at least partially define a second connection apparatus. The propshaft system additionally includes a propshaft portion extending at least partially between the first connection apparatus and the second connection apparatus. The second grease cover contour surface will interfere with the first flange contour surface to provide a visual notification of incorrect orientation of the propshaft portion within the propshaft system.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

DETAILED DESCRIPTION

Figure 1:
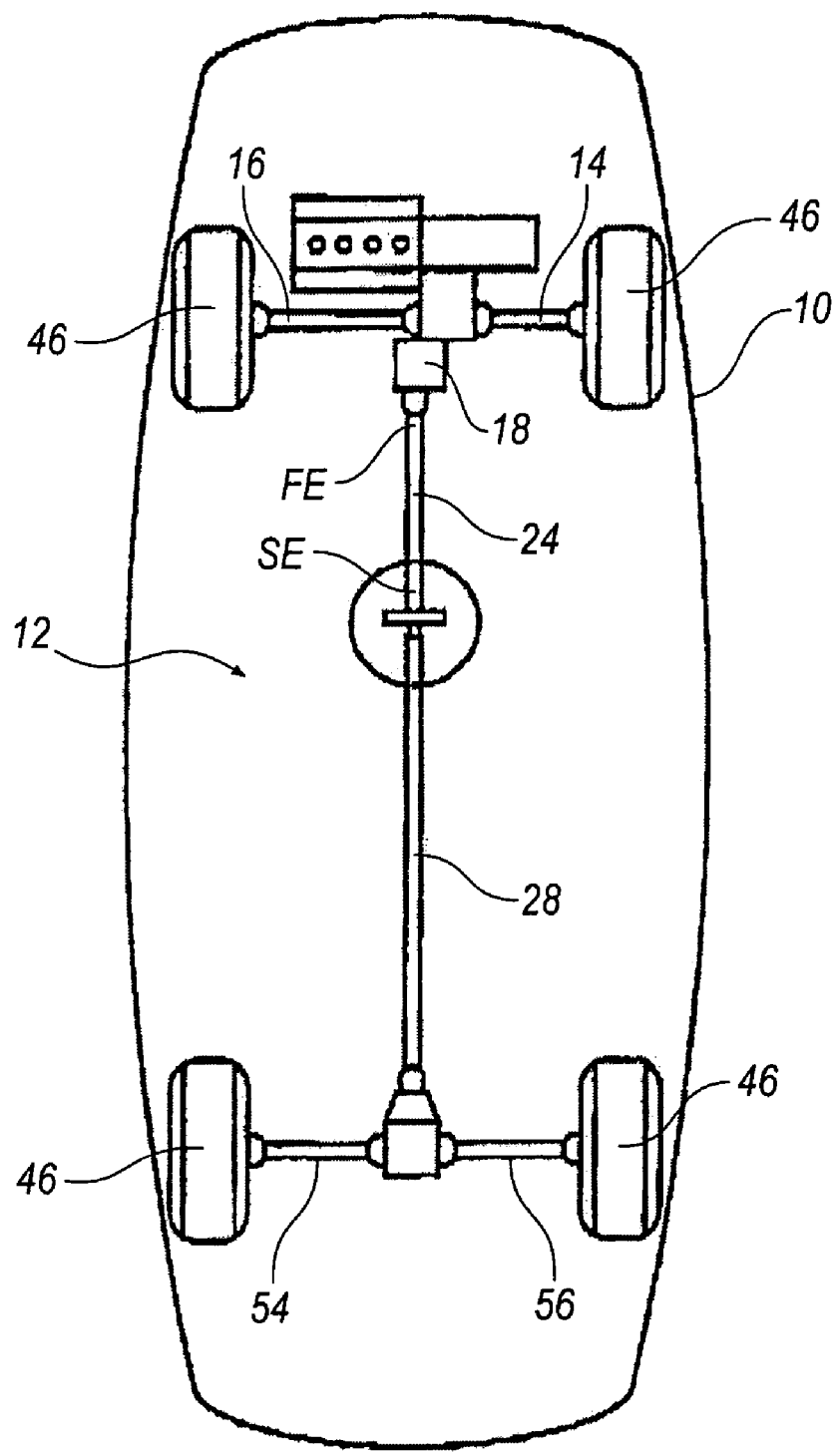
FIG. 1 is a bottom view of a vehicle according to an embodiment.
Figure 2:
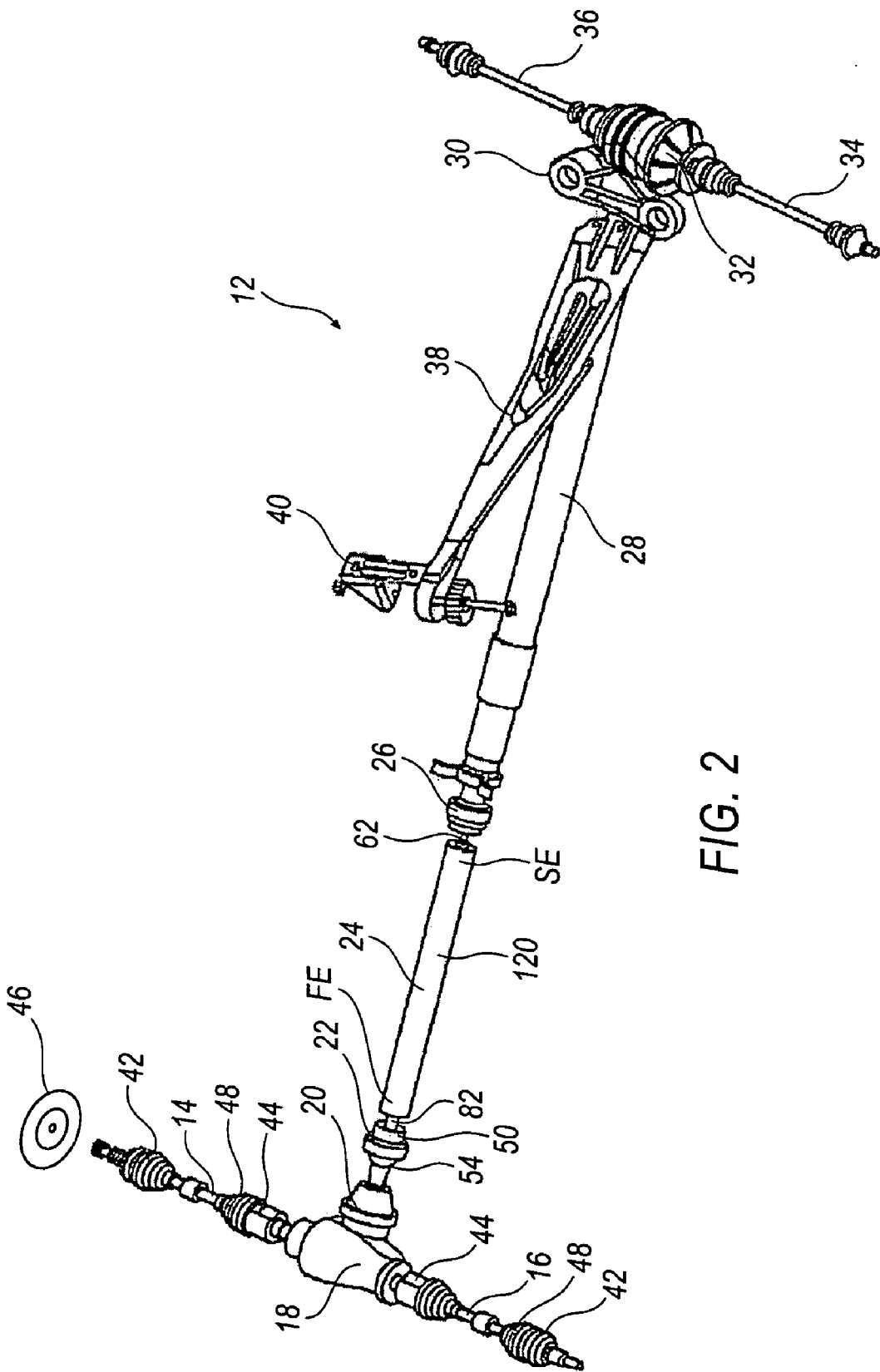
FIG. 2 is a perspective view of a drive system according to an embodiment.

FIG. 1 illustrates a motor vehicle 10. Motor vehicle 10 includes an operative wheel drive system 12. The drive system 12 includes a pair of front half shaft assemblies 14, 16. The front half shaft assemblies 14, 16 are connected to a front differential 18. Connected to front differential 18 is a power take off unit 20. The power take off unit 20 is operatively connected to a high speed fixed joint 22. Operatively connected to the high speed fixed joint 22 is a front prop shaft, or front propeller shaft assembly, 24. The front propshaft 24 has a first end FE and a second end SE. Operatively connected to front prop shaft assembly 24 is a VL style plunging constant velocity joint designated as reference numeral 26. Connected to the VL style constant velocity joint 26 is a rear prop shaft assembly 28. The rear prop shaft assembly 28 is connected on one end to a Cardan joint assembly (not numbered). The Cardan joint assembly may be operatively connected to a speed sensing torque device 30. The speed sensing torque device 30 is operatively connected to a rear differential assembly 32. A pair of rear half shaft assemblies 34, 36 are each connected to the rear differential assembly 32. As shown in FIG. 2, attached to the rear differential assembly 32, is a torque arm 38. The torque arm 38 is further connected to a torque arm mount 40, which is attached to the body of vehicle 10.

The front half shaft assemblies 14, 16 are comprised of fixed constant velocity joints 42, and an interconnecting shaft in a plunging style constant velocity joint 44. The plunging style constant velocity joints 44 are operatively connected to the front differential 18. The plunging style constant velocity joints 44 are plug in style in this embodiment. However, any style of constant velocity joint half shaft assembly, may be used depending upon the application. In the embodiment illustrated, the stem portion of each joint 42 is splined such that each joint 42 interacts with a front wheel 46 of vehicle 10 and has a threaded portion which also connects the wheel 46 to half shaft assembly 34, 36. As also shown in FIG. 2, constant velocity joint boots 48 are utilized to contain constant velocity joint lubricant, which generally is grease, within the constant velocity joint to keep the constant velocity joints lubricated for life.

The power take off unit 20 may be mounted to the face of a transmission of vehicle 10 (not numbered) and receives torque from the front differential 18. The transmission is operatively connected to an engine of the vehicle 10 (not numbered). In the embodiment illustrated, the front differential 18 has the same gear ratio as the rear differential 32 and drives the front prop shaft 24 through the high speed fixed joint 22 from the front differential axis.

Figure 3:
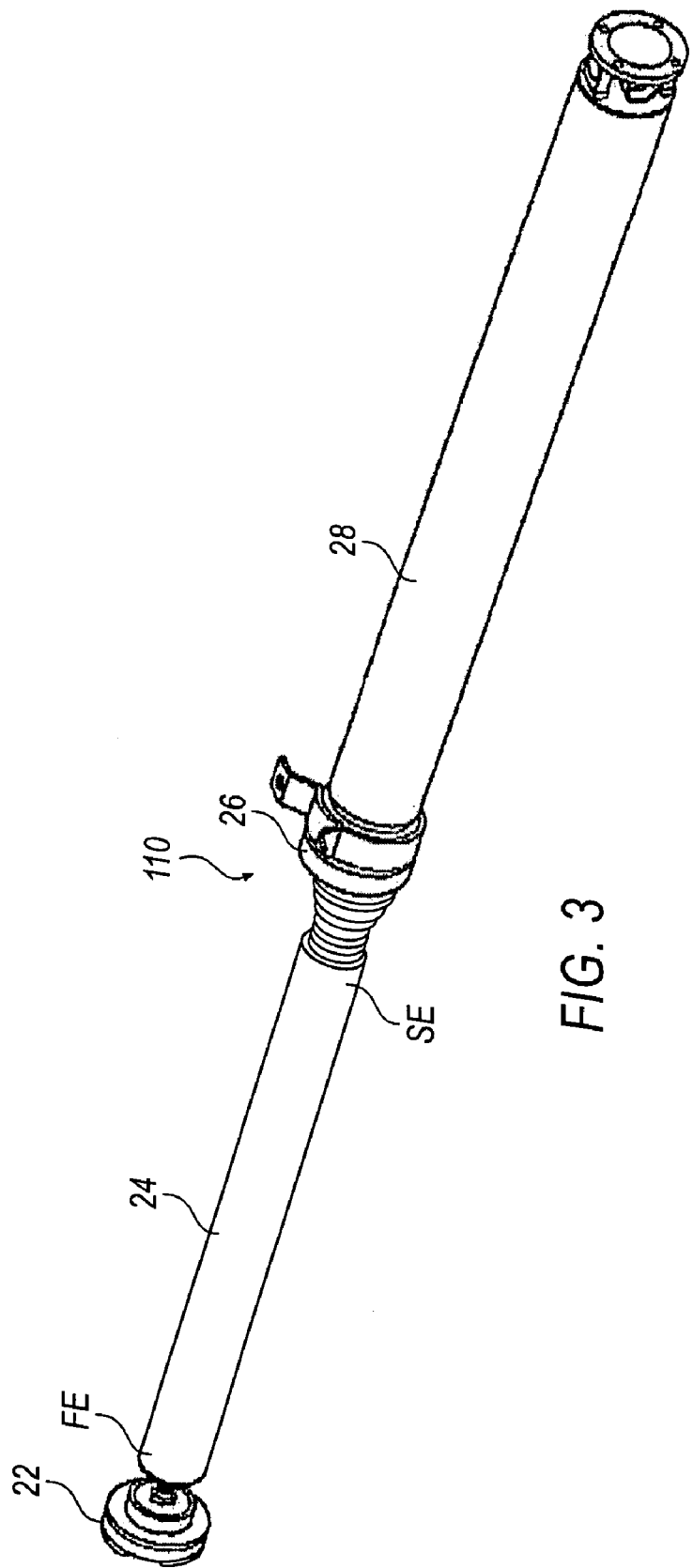
FIG. 3 is a perspective view of a prop shaft according to an embodiment.
Figure 4:
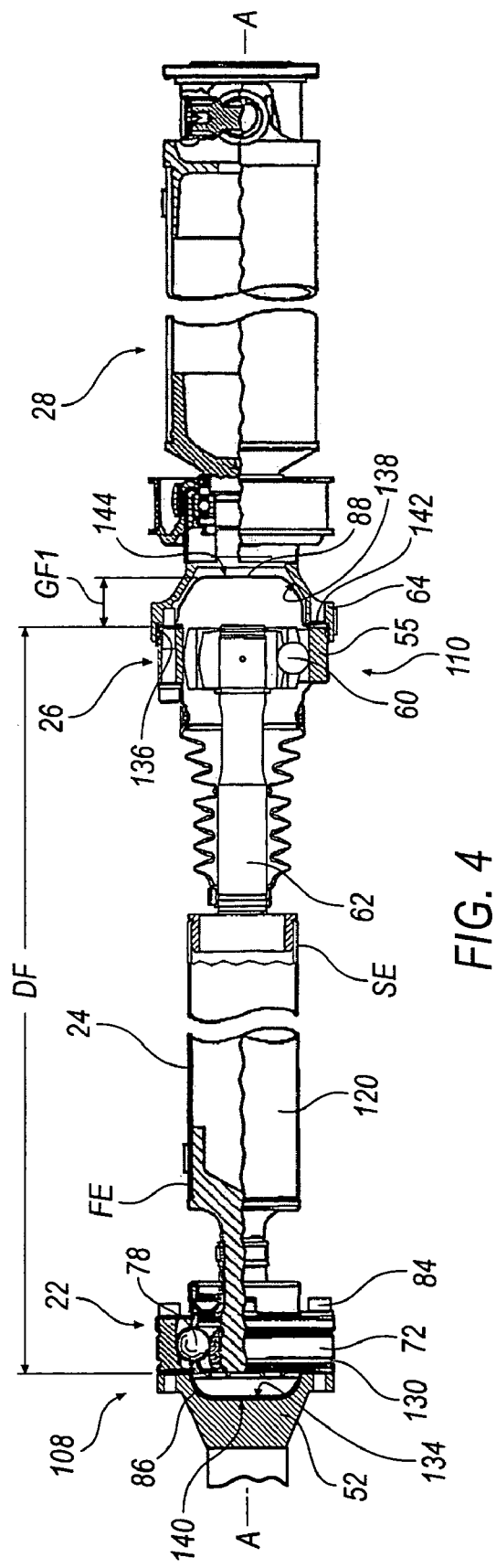
FIG. 4 is a partial sectional view of a prop shaft according to an embodiment.
Figure 5:
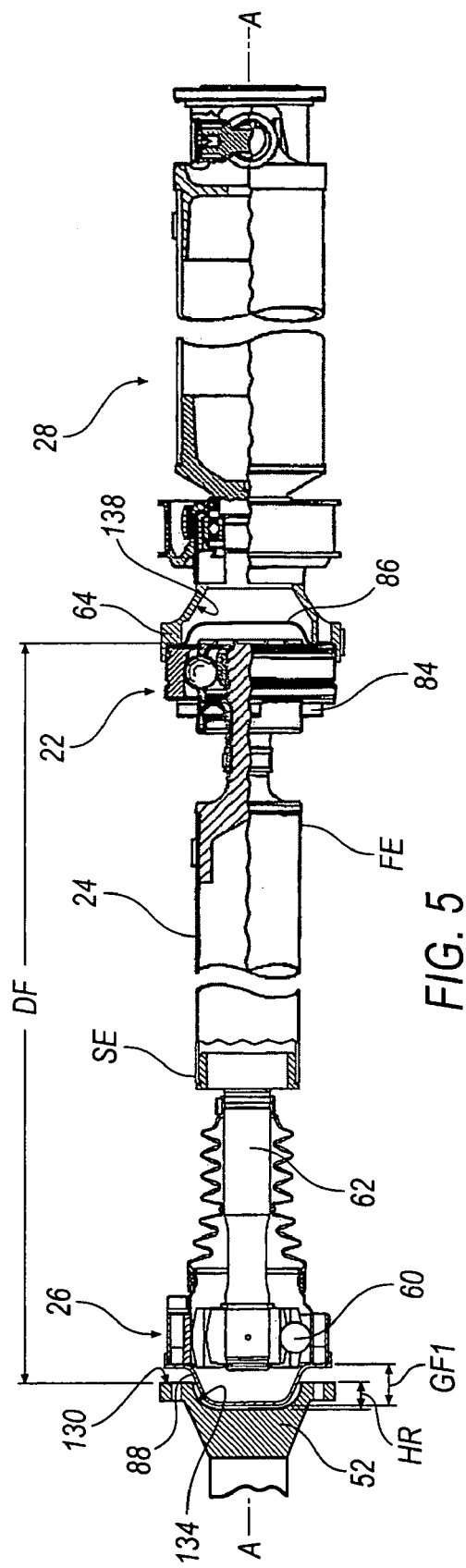
FIG. 5 is a partial sectional view of the prop shaft of FIG. 4 in an undesired configuration, or incorrect orientation.

With reference to FIGS. 3-5, and as mentioned earlier, high speed fixed joint 22 is connected at one end of the front differential 18 and at the other end to a front prop shaft 24. A VL type plunging constant velocity joint 26 is connected to the rear prop shaft 28 and to front prop shaft 24. The high speed fixed joint 22 may have a revolution per minute (RPM) capacity of 6000 RPMs with the preferable range of three to five thousand RPMs, a torque capacity of five to fifteen hundred Newton meters, but the preferred capacity of six to seven hundred Newton meters, and an inner capacity of up to 15 degrees with a preferable capacity of three to six degrees. The drive system 12 may use other constant velocity joints and/or Cardan joints or universal joint technology although, a high speed fixed joint is preferred.

The high speed fixed joint 22 includes a boot 50 which is utilized to enclose grease (not shown) required for lubrication of the high speed fixed joint 22. The front prop shaft 24 in the present invention is manufactured from steel providing a very low run up and critical high speed capacity higher than the second engine order.

Figure 6:
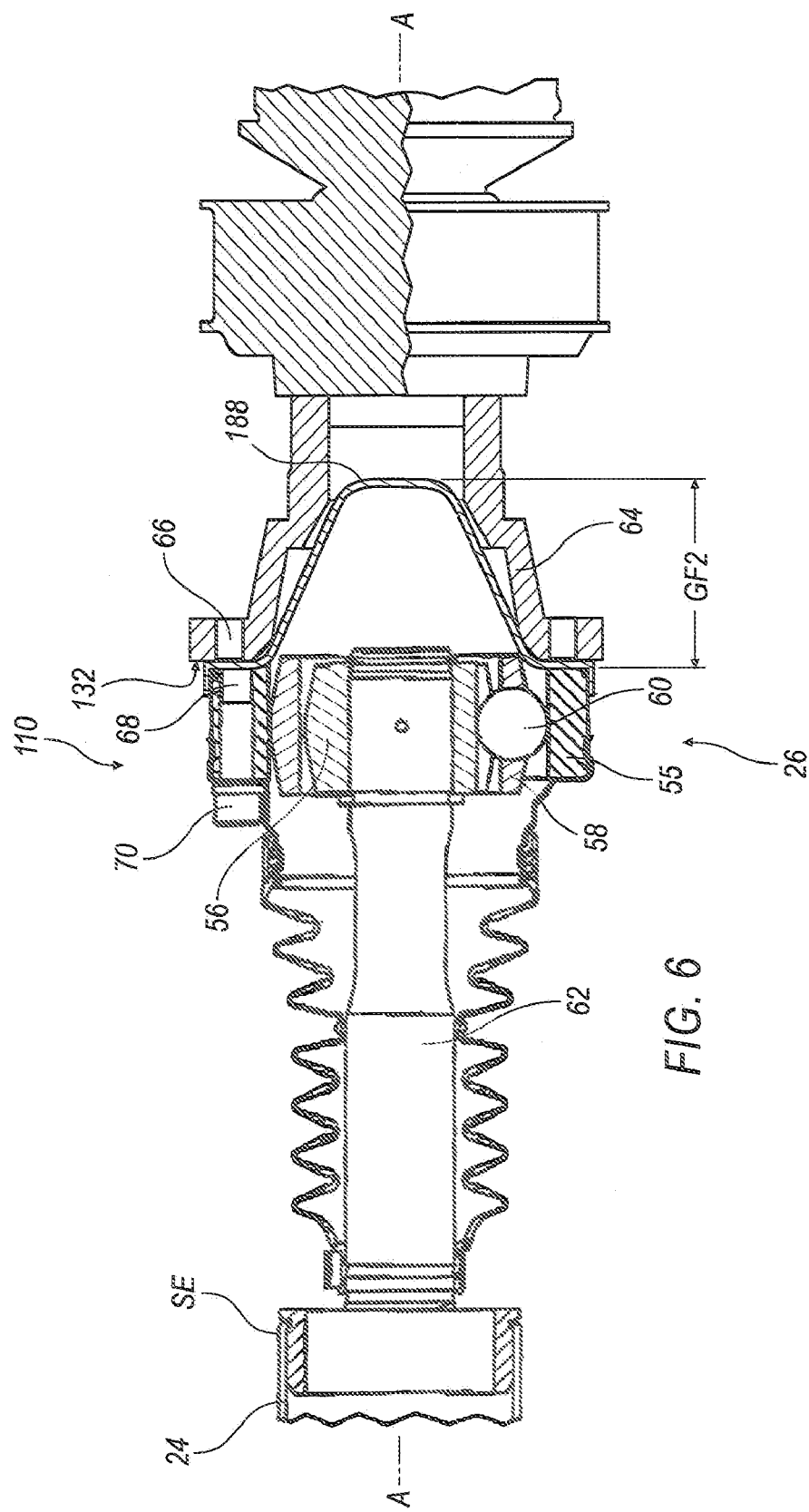
FIG. 6 is a partial sectional view of a prop shaft according to an embodiment.

Referring to FIG. 6, and as mentioned earlier, on the second end SE of the front propeller shaft 24 is a plunging VL constant velocity joint 26. The plunging VL constant velocity joint 26 includes an outer race 54 with an inner race 56 arranged within the outer race 54. The plunging constant velocity joint 26 also includes a cage 58 for supporting and locating a plurality of rolling elements 60 between an inner surface of the outer race 54 and an outer surface of the inner race 56. The plunging constant velocity joint 26 has a stub shaft 62 rotatably fixed to an inner bore (not numbered) of the inner race 56. The plunging VL constant velocity joint 26 mates with a rear flange 64 connected to one end of the front prop shaft 24 and to the outer race 54 of the VL plunging constant velocity joint 26 on an opposite end thereof. The rear flange 64 has a plurality of orifices 66 therein that will align with the plurality of orifices 68 through a surface of the outer race 54 of the VL plunging constant velocity joint 26 and allow for fasteners 70 to secure the VL plunging constant velocity joint 26 to the rear flange 64 and hence the front prop shaft 24 of the automotive vehicle. As best seen in FIG. 4, the rear flange 64 is coupled for rotation with the rear prop shaft assembly 28.

Figure 7:
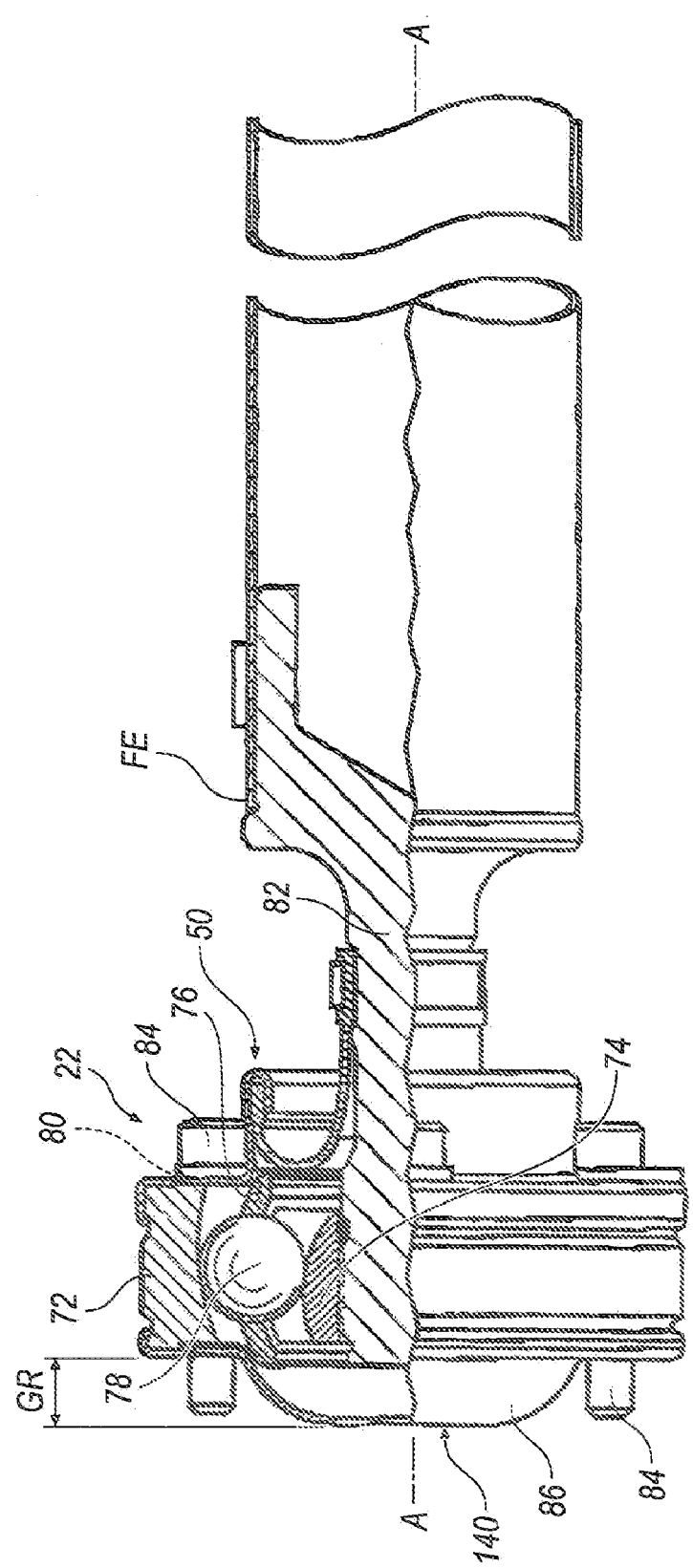
FIG. 7 is a partial sectional view of a portion of the prop shaft of FIG. 4.

Referring to FIG. 7, the high speed fixed constant velocity joint 22 as described above is located on the front end FE of the propeller shaft 24. The high speed fixed constant velocity joint 22 includes an outer race 72 with an inner race 74 arranged therein. A cage 76 and a plurality of rolling elements 78 are arranged between the inner race 74 and outer race 72 for transfer of constant velocity rotary motion through the high speed fixed joint 22. The high speed fixed constant velocity joint 22 includes a front flange 52 that is connected to the front differential 18 on one end and to the outer race 72 of the high speed constant velocity joint 22 on the opposite end. The outer race 72 of the constant velocity joint 22 has a plurality of orifices 80 therethrough that mate with and align with a plurality of orifices through the front flange 52 of the high speed constant velocity joint 22. The high speed fixed constant velocity joint 22 has a stub shaft 82 rotatably fixed to an inner bore (not numbered) of the inner race 74. Fasteners 84 will connect the high speed constant velocity joint 22 to the front flange 52 during installation of the constant velocity joint.

The high speed constant velocity joint 22 includes a grease cover 86 on one end thereof. The plunging VL constant velocity joint 26 also includes a grease cover 88 in contact with the outer race 54 and rear flange 64 of the VL constant velocity joint 26. The grease covers 86, 88 will ensure the lubricant stays within the VL plunging constant velocity joint 26 and the high speed fixed joint 22 for proper lubrication of the joints.

With brief reference to FIG. 4, the joint 22 and the front flange 52 collectively form a first connection apparatus 108. Also, the joint 26 and the rear flange 64 collectively form a second connection apparatus 110.

With specific reference to FIGS. 4 and 5, the front propeller shaft assembly 24 includes the high speed fixed joint 22, the constant velocity joint 26, and an interconnecting member 120. The interconnecting member 120 extends between the stub shaft 62 of the constant velocity joint 26 and the stub shaft 82 of the high speed constant velocity joint 22 (as also seen in FIG. 7). The front flange 52 has a mounting surface 130 that mates with the outer race 72 of the high speed constant velocity joint 22 (FIGS. 4 and 7), and a front flange contour surface 134. The rear flange 64 has a mating surface 136 (FIG. 6) that mates with the outer race 54 of the constant velocity joint 26, and a rear flange contour surface 138. The mounting surface 130 of front flange 52 is separated from the mounting surface 132 of rear flange 64 by a distance DF (FIGS. 4 and 5).

As best seen in FIG. 4, the first grease cover 86 has a first grease cover contour surface 140 that matingly contours the first flange contour surface 134. As best seen in comparing FIGS. 4 and 5, the second grease cover 88 has a second grease cover mounting surface 142 and a second grease cover contour surface 144 that matingly contours the rear flange contour surface 138 to provide a visual notification of correct orientation of the propshaft portion within the propshaft system.

As best seen in FIG. 5, when the propshaft 24 is incorrectly oriented in the propshaft system 12, that is, when the fixed joint 22 is oriented farther from the front differential 18 than the plunging joint 26, interference between the second grease cover 88 and the front flange 52 will provide a visual notification to a technician that the propshaft 24 is incorrectly oriented, and will prevent the propshaft 24 from being readily installed in an incorrect orientation. In the embodiment of FIG. 5, the interference is a contact between the second grease cover contour surface 144 and the front flange contour surface 134. This interference prevents the front flange 52 mounting surface 130 from full contact with the second grease cover mounting surface 142.

According to an embodiment, the VL plunging constant velocity joint 26 has a lengthened grease cover 88. In particular, as shown in FIG. 6, the grease cover or cap 88 will have a generally U-shaped cross section. The grease cover or cap 88 will also have a circumferential lip 90 generally having an L-shaped cross section at one end thereof. The grease cover 88 will have an extended or lengthened body 92 as shown. This extended or lengthened body 92 will have a predetermined depth GF2, which will penetrate into a bore 94 of the rear flange 64 of the VL plunging joint 26. It should be noted that the improved grease cover 88 is currently made of a metal material, however any hard plastic, composite, ceramic or the like material may also be used.

Figure 9:
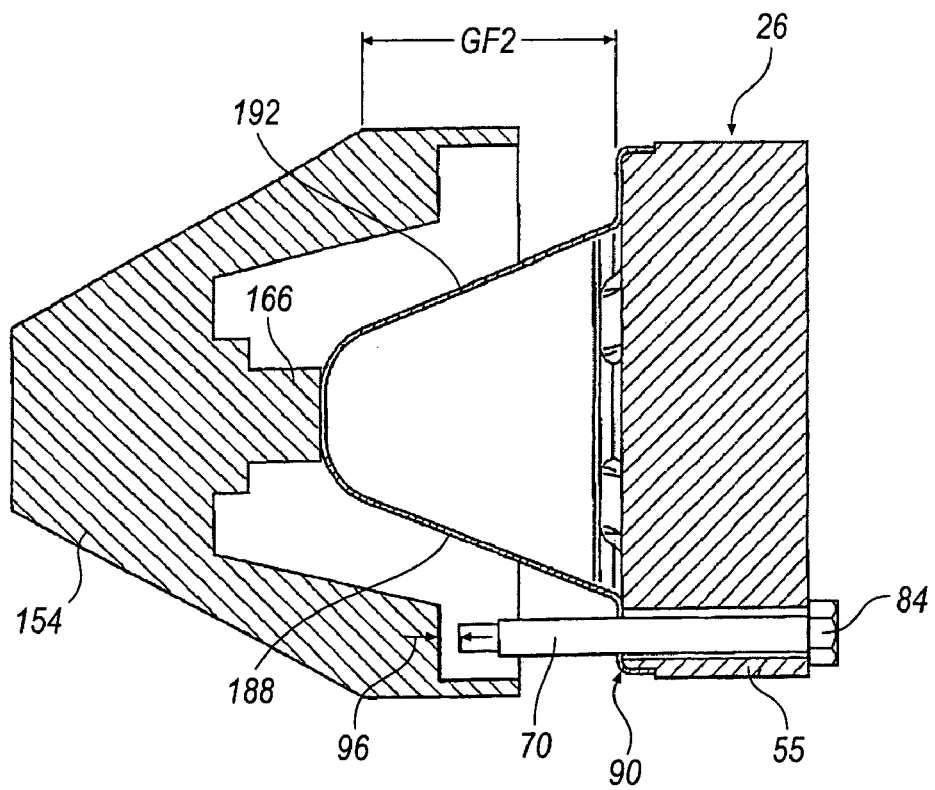
FIG. 9 is a partial sectional view of a portion of the prop shaft of FIG. 8 in an undesired configuration.

The bell portion or body 92 of the grease cover 88 will be lengthened a predetermined distance such that if the prop shaft 24 is mistakenly installed backwards (incorrect orientation) into the vehicle the lengthened grease cover 88 will prevent installation of the plunging constant velocity joint 26 into the high speed fixed joint front flange 52 via interference with a surface of the front flange 52 (FIG. 5) and/or a mechanical stop as shown in FIG. 9. In an embodiment contemplated the incorrect installation of the prop shaft 24 will leave a minimum of a five millimeter gap 96 between the end of a fastener 70 of the plunging constant velocity joint 26 and a threaded orifice of the high speed fixed joint front flange 52. This will ensure that the installer of the prop shaft 24 into the vehicle drive line of the automotive vehicle, cannot torque and secure the prop shaft 24 when orientated reversed, or backwards, within the drive system 12.

As shown in FIG. 6 an embodiment may include a modified plunging VL rear flange 164 for use with the modified grease cover 188 for the plunging VL type joint 26. The modified rear flange 164 includes an increased sized bore 94 that has been lengthened and widened to allow entry and mating with the lengthened grease cover 188 of the VL plunging joint 26. As shown in FIG. 6, during proper installation of the prop shaft 24 the modified grease cover 188 will mate with an be allowed to be inserted within the expanded, in both a width and length direction, flange inner bore 94. The modified grease cover 188, after proper installation, will be in contact at the lip 90 with a surface of the VL plunging style rear flange 164 and the outer race 54 of the VL plunging style joint 26. Therefore, with proper installation of the VL plunging joint 26 to the modified plunging rear flange 164 the fasteners 70 will be capable of being properly tightened while the fasteners 84 for the high speed fixed joint 22 (not shown) will be capable of being properly tightened and secured to the high speed fixed joint front flange 52 located at the front end FE of the front prop shaft 24.

It should be noted that the front flange 52 is preferably made of a steel material, however any other metal, hard plastic, composite, or the like may also be used depending on the design requirements of the drive line. It should be noted that it has been contemplated to leave a five millimeter gap 96 between the end of the fastener 70 and the threaded orifice of the high speed fixed joint front flange 52 however any other gap size may also be used depending on the design requirements and packaging requirements of the driveline. The modified grease cover 88 of the VL plunging constant velocity joint 26 will ensure that the fasteners are not tightened down and thus damage or crush the grease cover 88, as happened sometimes with the prior art arrangement. The extended grease cover 88 for the VL plunging constant velocity joint 22, expanded inner bore 94 for the VL rear flange 64 and front flange 52 together or in any combination provide a mechanical stop which will keep any installer from installing the prop shaft 24 backwards in the automotive vehicle driveline. Other contemplated embodiments are capable for the mechanical stop to create an in vehicle installation error proofing method for installation of a propeller shaft having common joint ends. It should be noted that the grease cover 88 in the embodiment shown has a length that ensures that if the prop shaft 24 is installed improperly into the high speed fixed joint front flange 52 it would create the five millimeter gap to ensure no tightening of the VL joint 26 with respect to the front flange 52. Therefore, any size grease cover 88 and any size inner bore 94 for a rear flange 64 may be designed to create specific mechanical stop features for different prop shafts in vehicle drivelines.

Figure 8:
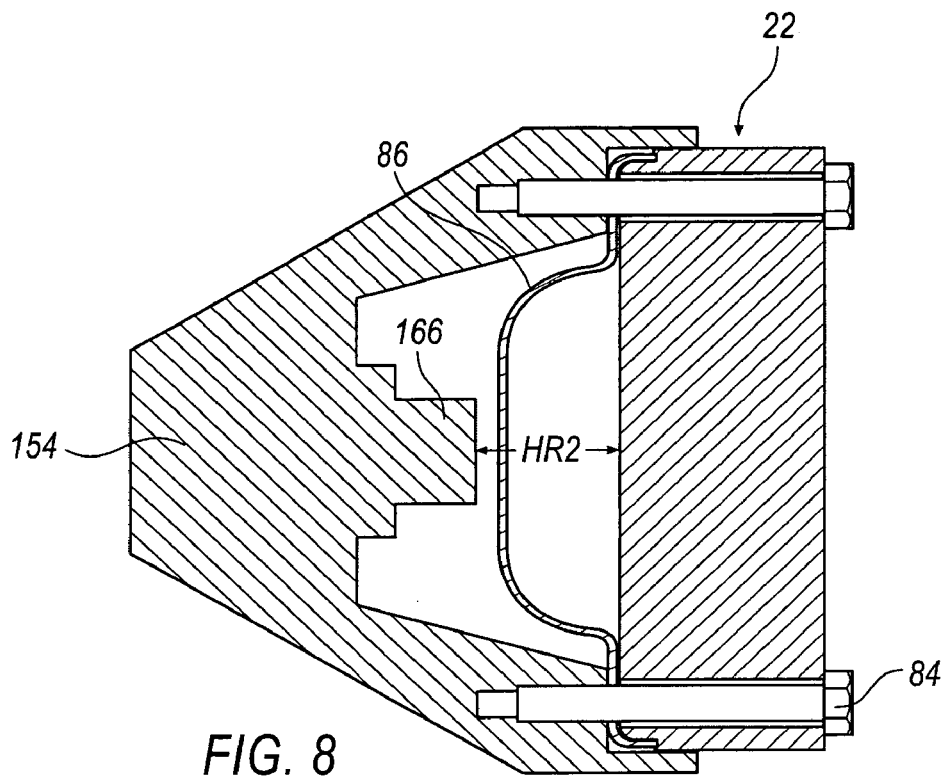
FIG. 8 is a partial sectional view of a portion of a prop shaft according to an embodiment.

As shown in FIG. 8, the front flange 52 is illustrated in an alternative embodiment as a front flange 152. Front flange 152 has an extension, or knob, 166 arranged at a center point or other portion of the high speed fixed constant velocity joint front flange 52. It should be noted that the original high speed fixed joint front flange 52 may be designed such that installation of the modified VL plunging cover 88 is not even possible. However, it is contemplated to put an extension 166 into the inner bore of the high speed constant velocity joint front flange 152 to ensure a mechanical stop occurs thus ensuring the prop shaft 24 cannot be installed backwards within the motor vehicle drive system 12. Therefore, further modification of the high speed fixed joint front flange 52 is also possible in an embodiment.

Figure 10:
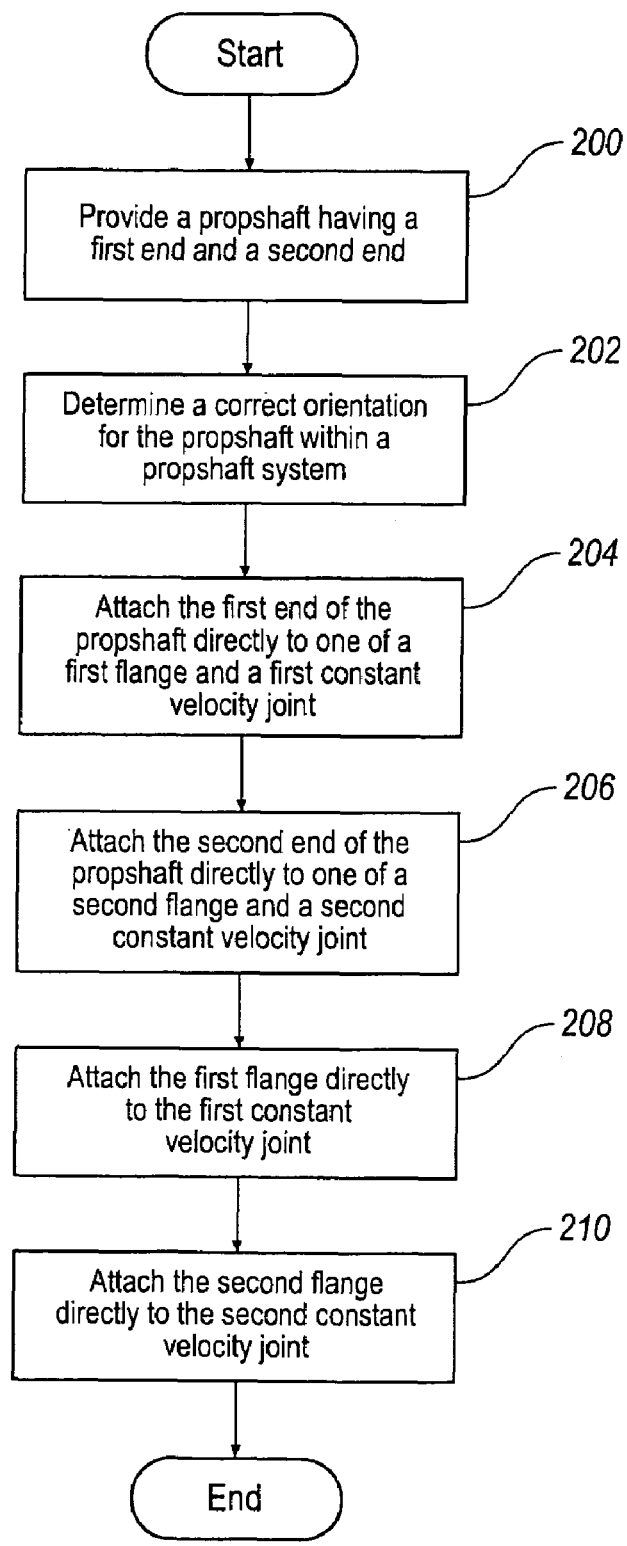
FIG. 10 is a flow chart showing a methodology of installation according to an embodiment.

FIG. 10 shows one methodology for insuring error proof installation of a prop shaft 24 in a motor vehicle driveline. In Step 200, an operator will provide a propshaft having a first end and a second end. In Step 202, one will determine a correct orientation for the propshaft within a propshaft system, typically with a plunging joint orientated nearest, the transmission and a fixed joint. In Step 204, one will attach the first end of the propshaft directly to one of a first flange and a first constant velocity joint. In Step 206, one will attach the second end of the propshaft directly to one of a second flange and a second constant velocity joint. In Step 208, one will attach the first flange directly to the first constant velocity joint. In Step 210, one will attach the second flange directly to the second constant velocity joint. Selective coupling of the first flange directly to the second grease cover will provide a visual notification of incorrect orientation of the propshaft within the propshaft system, as described herein.

While the embodiments illustrated include modifications to a grease cover 88 to error proof an installation of a propshaft within a propshaft system, one may also modify the outer race 72 such that the grease cover 88 can not be attached thereto to prevent installation of the grease cover 88 on the joint 22, to provide further error proof features.

In the embodiment illustrated, the joints 22, 26 and front prop shaft 24 are interposed between front flange 52 and rear flange 64, although in other embodiments the front prop shaft 24 may be affixed directly to front flange 52 and rear flange 64 with joint 22 interposed between the front flange 52 and front differential 18, and the joint 26 interposed between the rear flange 64 and the rear prop shaft 28 to accomplish a similar error proof installation control feature.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A propshaft system comprising:
a first constant velocity joint generally defining a first axis and having an inner first race, an outer first race, and a first grease cover mated to the outer first race, wherein the first grease cover is defined, at least in part, by a first grease cover flange surface and a first grease cover contour surface;
a first flange having a first flange mating surface and a first flange contour surface, wherein the first flange is selectively coupled to the first constant velocity joint such that the first flange mating surface is in contact with the first grease cover flange surface, and the first flange contour surface is directly adjacent the first grease cover contour surface, wherein the first constant velocity joint and the first flange at least partially define a first connection apparatus;
a second constant velocity joint generally defining a second axis and having an inner second race, an outer second race, and a second grease cover mated to the outer second race, wherein the second grease cover is defined, at least in part, by a second grease cover flange surface and a second grease cover contour surface;
a second flange having a second flange mating surface and a second cover contour surface, wherein the second flange is selectively coupled to the second constant velocity joint such that the second flange mating surface is in contact with the second grease cover flange surface, and the second cover contour surface is directly adjacent the second grease cover contour surface, wherein the second constant velocity joint and the second flange at least partially define a second connection apparatus; and
a propshaft portion extending at least partially between the first connection apparatus and the second connection apparatus, wherein the second grease cover contour surface will interfere with the first flange contour surface to provide a visual notification of incorrect orientation of the propshaft portion within the propshaft system.

2. The system of claim 1, wherein one of the first constant velocity joint and the second constant velocity joint is a plunging joint.

3. The system of claim 1, wherein the axial length of the second grease cover, measured as the maximum distance between the second grease cover flange surface and the second grease cover contour surface parallel to the second axis, is greater than an axial length of the first grease cover, measured as the maximum distance between the first grease cover flange surface and the first grease cover contour surface parallel to the first axis.

4. The system of claim 1, wherein the second grease cover contour surface will interfere with the first flange contour surface to prevent installation of the propshaft system in an incorrect orientation.

5. The system of claim 4, further comprising a stop portion formed on the first flange, wherein the stop portion will contact the second grease cover when the second grease cover is interposed within the first flange.

6. The system of claim 5, wherein the stop portion will not interfere with the first grease cover to prevent installation of the first connection apparatus.

7. The system of claim 1, wherein the second grease cover contour surface will matingly contour the second flange contour surface to provide a visual notification of correct orientation of the propshaft portion within the propshaft system.

8. The system of claim 1, further comprising a fastener selectively interposed through a portion of the first flange and the first outer race.

9. The system of claim 1, wherein the propshaft portion is directly connected to the first flange.

10. A propshaft system comprising:
a first constant velocity joint having a inner first race, a outer first race, and a first grease cover mated to the outer first race, wherein the first grease cover is defined, at least in part, by a first grease cover mating surface;
a first flange having a first flange mating surface, wherein the first flange is selectively coupled to the first constant velocity joint such that the first flange mating surface is directly adjacent the first grease cover mating surface, wherein the first constant velocity joint and the first flange at least partially define a first connection;
a second constant velocity joint having a inner second race, a outer second race, and a second grease cover mated to the outer second race, wherein the second grease cover is defined, at least in part, by a second grease cover mating surface;
a second flange having a second flange mating surface, wherein the second flange is selectively coupled to the second constant velocity joint such that the second flange mating surface is directly adjacent the second grease cover mating surface, wherein the second constant velocity joint and the second flange at least partially define a second connection; and
a propshaft portion extending at least partially between the first connection and the second connection,
wherein a surface defining the second constant velocity joint will interfere with a surface of the first flange, thereby preventing installation the first flange with the second constant velocity joint.

11. The system of claim 10, wherein the axial length of the second grease cover, measured as the maximum distance between the second grease cover flange surface and the second grease cover contour surface parallel to the second axis, is greater than an axial length of the first grease cover, measured as the maximum distance between the first grease cover flange surface and the first grease cover contour surface parallel to the first axis.

12. The system of claim 10, wherein the second grease cover contour surface will interfere with the first flange contour surface to prevent installation of the propshaft system in an incorrect orientation.

13. The system of claim 12, further comprising a stop portion formed on the first flange, wherein the stop portion will contact the second grease cover when the second grease cover is interposed within the first flange.

14. The system of claim 13, wherein the stop portion will not interfere with the first grease cover to prevent installation of the first connection apparatus.

15. The system of claim 10, wherein the second grease cover contour surface will matingly contour the second flange contour surface to provide a visual notification of correct orientation of the propshaft portion within the propshaft system.

16. The system of claim 10, wherein the propshaft portion is directly connected to the first flange and the second flange.

* * * * *

UNITED STATES PATENT AND TRADEMARK OFFICE
CERTIFICATE OF CORRECTION

PATENT NO.       : 7,635,307 B2                                               Page 1 of 1
APPLICATION NO. : 11/452150
DATED            : December 22, 2009
INVENTOR(S)      : Jason T. Curi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Ninth Day of November, 2010

David J. Kappos
*Director of the United States Patent and Trademark Office*